Patented Sept. 19, 1950

2,522,939

UNITED STATES PATENT OFFICE 2,522,939

PROCESS FOR THE PRODUCTION OF PHENOLPHTHALEIN

Harry R. Gamrath, St. Louis, Mo., assignor to Monsanto Chemical Company, St. Louis, Mo., a corporation of Delaware No Drawing. Application April 22, 1949, Serial No. 89,165

5 Claims. (Cl. 260—337)

1

This invention relates to phenolphthalein; more specifically, this invention relates to an improvement in the process for the production of phenolphthalein.

Phenolphthalein is generally prepared commercially by the condensation reaction of 1 mol of phthalic anhydride with approximately 2 mols of phenol in the presence of a suitable condensation agent. The most widely used condensation agents are zinc chloride and sulfuric acid. Both of these agents, however, are not entirely satisfactory. When zinc chloride is used alone, the reaction proceeds quite slowly and long heating periods at relatively high temperatures are required to obtain good yields, or large quantities of zinc chloride are necessary which greatly affects the economics of the process. With the use of sulfuric acid as the condensation agent, undesirable concurrent reactions take place consuming costly quantities of phenol in the sulfonating action which always occurs.

Numerous agents have been proposed to be used in conjunction with zinc chloride in order to increase its condensation activity. Generally speaking, these activating agents have been of academic interest only as they have not proven to be too particularly desirable from a commercial stand point. Among these suggested activating agents are the aromatic sulfonic acids, hydrogen chloride, and aluminum chloride.

Aromatic sulfonic acids are deficient as activating agents in that relatively large quantities of the acids are required to enhance the activity of the zinc chloride thereby rendering the process uneconomical. Hydrogen chloride can lead to the formation of hydroxyanthraquinones. Aluminum chloride renders purification of the resultant phenolphthalein quite difficult due to the formation of aluminum complexes which necessitate treating the crude phenolphthalein with hot dilute mineral acids to remove the aluminum salts.

It is an object of this invention to provide an improvement in the process for the production of phenolphthalein. It is another object of this invention to provide an improvement in the process for the production of phenolphthalein wherein phenolphthalein may now be obtained in high yields and exceptional purity by the condensation reaction of 1 mol of phthalic anhydride with approximately 2 mols of phenol in the presence of zinc chloride as the condensation agent. Further objects will become apparent from the description of the novel process of this invention and the claims.

2

It has now been discovered that in the condensation reaction between phthalic anhydride and phenol in the presence of zinc chloride as the condensation agent, phenolphthalein may be obtained in exceptionally high yields and purity if there is also incorporated into the reaction mass a minor amount of a sulfur acid chloride selected from the group consisting of thionyl chloride, sulfuryl chloride and chlorosulfonic acid to serve as an activating agent for the zinc chloride condensation agent.

The aforementioned characteristic accelerating effect of the sulfur acid chlorides on the condensation reaction results when only relatively small quantities of the sulfur acid chlorides are utilized. It is, therefore, preferred that from about 0.05 mol to about 0.25 mol of the sulfur acid chloride be used for each mol of phthalic anhydride. When the charge of the sulfur acid chloride is greater than 0.25 mol per mol of phthalic anhydride, many undesirable features arise. Larger quantities of thionyl chloride than that of the preferred range show the influence of sulfur dioxide and/or gaseous hydrochloric acid in the condensation reaction. If greater quantities of thionyl chloride are used, the gaseous products resulting from the hydrolysis begin to appear in quantities which exceed their solubility limit in the reaction mass thereby necessitating the provision of suitable equipment to absorb these excess gases. If chlorosulfonic acid is used in quantities substantially over and above the preferred limits, it begins to exert its effect as a chlorosulfonating agent, while excessive quantities of sulfuryl chloride causes the material to begin to act as a chlorinating agent. These well known behaviors of the sulfur acid chlorides cause technical operating difficulties and undesirable side reactions in the phenolphthalein condensation reaction when used in quantities in excess of the preferred range. When the charges are small, or within the preferred range, these undesirable difficulties and side reactions become negligible.

The preferred temperature range to be maintained during the condensation reaction is from about 85° C. to about 125° C. At the lower condensation temperatures, phenolphthalein is produced with the highest degree of purity; but with condensation temperatures below about 85° C., the reaction rate drops to such an extent that it is no longer commercially feasible. Temperatures in excess of 125° C. cause the formation of a considerable amount of impurities which renders the refining of phenolphthalein exceedingly difficult.

The quantities of phthalic anhydride, phenol and zinc chloride utilized in the improved process of this invention are governed by the same principle which governs their quantities in the processes heretofore practical wherein no sulfur acid chloride was utilized as an activating agent for zinc chloride. Thus, it is preferred for best yields that approximately two molecular proportions of phenol be utilized for each one molecular proportion of phthalic anhydride and approximately 0.5 molecular proportion of zinc chloride be utilized for each molecular proportion of phthalic anhydride. However, the quantities of these reactants are not of a critical nature from the standpoint of their behavior in the presence of the sulfur acid chloride activating agents of this invention. The quantities of phthalic anhydride, phenol and zinc chloride may be varied to meet certain operating conditions and such a process will be substantially improved through the incorporation of a sulfur acid chloride into the reaction mass.

The process for the production of phenolphthalein according to this invention is relatively simple. All chemicals may be charged together into a suitable reactor. The mixture is then heated in the desired temperature range until a satisfactory degree of reaction is obtained and then further reaction is stopped by the addition of water. Thereafter, the kettle charge is poured into more water and the grainy slurry filtered. Crude phenolphthalein is then washed on the filter with hot water until the filtrate is no longer acid to methyl orange test paper.

The method of refining crude phenolphthalein is well known to those skilled in the art. The commercial "yellow phenolphthalein" is produced by dissolving crude phenolphthalein in a dilute alkali, such as sodium or calcium hydroxide, filtering to remove insoluble matter, and then acidifying the clear filtrate with a mineral acid. Yellow phenolphthalein thus produced has a melting point in the range of from 254° C. to about 260° C., U. S. P., phenolphthalein—phenolphthalein that passes the specifications of the United States Pharmacopoeia, vol. XIII—is produced by dissolving the crude in ethanol, refluxing with decolorizing charcoal, filtering, and then crystallizing the phenolphthalein from the alcoholic solution. U. S. P. phenolphthalein has a melting point above 258° C., usually about 261° to 262° C.

The following examples are illustrative of the novel improved process of this invention:

*Example I*

To a 500 ml. wide-mouth Erlenmeyer flask provided with a gate-type agitator, a thermometer and a vent line was charged 148 g. of phthalic anhydride, 188 g. of phenol, 68 g. of anhydrous zinc chloride and 6 g. of thionyl chloride. The reactor was closed with a rubber stopper covered with lead foil. After the reactants had been charged, the mass was stirred and heated by means of an oil bath to about 120° C. and stirred for about 24 hours at this temperature. 100 ml. of warm water was then added, the mixture stirred for a few minutes and then poured into 500 ml. of water. The resulting slurry was filtered and the solid mass on the filter washed with hot water (about 60° C.) until the filtrate was no longer acid to methyl orange test paper. 261.6 g. of crude dried phenolphthalein were obtained representing a yield of 82.2%, based on phthalic anhydride and phenol.

*Example II*

When the reactor system, as described in Example I, was charged with exactly the same quantity of reactants as shown therein, except adding 15 g. of thionyl chloride instead of the 6 g. used, and the mass agitated and heated at about 120° C. for about 24 hours, 299.3 g. of crude dried phenolphthalein were obtained representing a yield of 94.1%, based on phthalic anhydride and phenol.

*Example III*

When the reactants set forth in Example II were stirred and heated at 90° to 95° C. for 43 hours, there was obtained a 70.5% yield of dry phenolphthalein, based on phthalic anhydride and phenol, which had a melting point of 259° to 260° C. without further purification treatment.

*Example IV*

A charge consisting of 1 mol of phthalic anhydride, 2 mols of phenol, 0.5 mol of zinc chloride and 0.25 mol of sulfuryl chloride was stirred and heated for 24 hours at about 120° C. and the crude phenolphthalein obtained as described in Example I. The yield was 95.1%, based on phthalic anhydride and phenol.

*Example V*

To the reactor system as described in Example I, was charged 148 g. of phthalic anhydride, 188 g. of phenol, 68 g. of zinc chloride and 14.6 g. of chlorosulfonic acid. The mixture was stirred and heated for 42 hours at 90° to 95° C. The reaction was finished as described in Example I, and a 76.5% yield of phenolphthalein obtained, based on phthalic anhydride and phenol. Phenolphthalein thus obtained had a melting point of 258° to 259° C.

*Example VI*

When 1 mol of phthalic anhydride, 2 mols of phenol, 0.5 mol of zinc chloride and 0.25 mol of chlorosulfonic acid was stirred and heated at about 120° C. for 18 hours, and the reaction completed as described in Example I, a 92.9% yield of phenolphthalein, based on phthalic anhydride phenol, was obtained.

What is claimed is:

1. In the process for the preparation of phenolphthalein, the step comprising the reaction of phenol with phthalic anhydride in the presence of zinc chloride and from about 0.05 mol to about 0.25 mol per mol of phthalic anhydride of a sulfur acid chloride selected from the group consisting of thionyl chloride, sulfuryl chloride and chlorosulfonic acid.

2. In the process for the preparation of phenolphthalein, the step comprising the reaction of phenol with phthalic anhydride in the presence of zinc chloride and from about 0.05 mol to about 0.25 mol per mol of phthalic anhydride of a sulfur acid chloride selected from the group consisting of thionyl chloride, sulfuryl chloride and chlorosulfonic acid at a temperature in the range of from about 85° C. to about 125° C.

3. In the process for the preparation of phenolphthalein, the step comprising the reaction of phenol with phthalic anhydride in the presence of zinc chloride and from about 0.05 mol to about 0.25 mol of thionyl chloride per mol of phthalic anhydride at a temperature in the range of from about 85° C. to about 125° C.

4. In the process for the preparation of phenolphthalein, the step comprising the reaction of phenol with phthalic anhydride in the presence of zinc chloride and from about 0.05 mol to about 0.25 mol of sulfuryl chloride per mol of phthalic anhydride at a temperature in the range of from about 85° C. to about 125° C.

5. In the process for the preparation of phenolphthalein, the step comprising the reaction of phenol with phthalic anhydride in the presence of zinc chloride and from about 0.05 mol to about 0.25 mol of chlorosulfonic acid per mol of phthalic anhydride at a temperature in the range of from about 85° C. to about 125° C.

HARRY R. GAMRATH.

REFERENCES CITED

The following references are of record in the file of this patent:

UNITED STATES PATENTS

| Number | Name | Date |
|---|---|---|
| 1,086,123 | Bally | Feb. 3, 1914 |
| 1,681,361 | Pasternack | Aug. 21, 1928 |
| 1,940,494 | Hubacher | Dec. 19, 1933 |
| 2,192,485 | Hubacher | Mar. 5, 1940 |
| 2,374,891 | Peter | May 1, 1945 |